United States Patent
Zhang

(10) Patent No.: US 12,001,055 B2
(45) Date of Patent: Jun. 4, 2024

(54) GRATING, METHOD FOR MANUFACTURING GRATING, AND OPTICAL WAVEGUIDE

(71) Applicant: AAC Optics (Nanning) Co., Ltd., Nanning (CN)

(72) Inventor: Biming Zhang, Shenzhen (CN)

(73) Assignee: AAC Optics (Nanning) Co., Ltd., Nanning (CN)

( * ) Notice: Subject to any disclaimer, the term of this patent is extended or adjusted under 35 U.S.C. 154(b) by 0 days.

(21) Appl. No.: 17/835,877

(22) Filed: Jun. 8, 2022

(65) Prior Publication Data

US 2023/0194788 A1 Jun. 22, 2023

(30) Foreign Application Priority Data

Dec. 21, 2021 (CN) .......................... 202111573287.3

(51) Int. Cl.
*G02B 6/12* (2006.01)
*G02B 6/124* (2006.01)
*G02B 6/13* (2006.01)

(52) U.S. Cl.
CPC ............. *G02B 6/13* (2013.01); *G02B 6/124* (2013.01); *G02B 2006/12107* (2013.01)

(58) Field of Classification Search
CPC ..................................................... G02B 6/124
See application file for complete search history.

(56) References Cited

U.S. PATENT DOCUMENTS

| 5,471,548 | A  | * | 11/1995 | Brazas | G11B 7/124 |
| 6,707,561 | B1 | * | 3/2004  | Budach | G01N 21/7743 |
|           |    |   |         |        | 356/521 |
| 2005/0046943 | A1 | * | 3/2005 | Suganuma | G02B 5/3058 |
|           |    |   |         |        | 359/487.03 |
| 2006/0019374 | A1 | * | 1/2006 | Uematsu | C12Q 1/00 |
|           |    |   |         |        | 435/287.9 |
| 2006/0023212 | A1 | * | 2/2006 | Nishii | G02B 5/1866 |
|           |    |   |         |        | 356/328 |
| 2018/0095201 | A1 | * | 4/2018 | Melli | G02B 27/0172 |

FOREIGN PATENT DOCUMENTS

JP 2004304097 A * 10/2004

* cited by examiner

*Primary Examiner* — Charlie Y Peng
(74) *Attorney, Agent, or Firm* — W&G Law Group

(57) ABSTRACT

A method for manufacturing a grating, a grating manufactured by the method, and an optical waveguide including the grating are provided. The method includes the following. A substrate is provided. A mask layer is formed on a surface of the substrate according to a target pattern structure of the grating, where the mask layer has a pattern structure complementary to the target pattern structure, and the pattern structure includes multiple protrusions and multiple recessed regions. A grating is formed by depositing a semiconductor material on the surface of the substrate. The semiconductor material is deposited in the multiple recessed regions of the pattern structure of the mask layer to form the target pattern structure. The mask layer is removed by lift-off. The method provided herein is simple in process and can enhance production efficiency. The manufactured grating has a relatively high refractive index and can reduce light scattering.

9 Claims, 2 Drawing Sheets

GRATING, METHOD FOR MANUFACTURING GRATING, AND OPTICAL WAVEGUIDE

TECHNIC FIELD

The disclosure relates to the technical field of optical equipment, and more particularly to a grating, a method for manufacturing the grating, and an optical waveguide.

BACKGROUND

Gratings are important components of various spectral analysis instruments, which are increasingly used in new fields such as metrology, imaging, information processing, inheritance optics, and optical communication. In recent years, with the rapid development of semiconductor technology, a new type of optical application products has also developed, such as augmented reality (AR) products. AR is to enhance the reality by the fusion of virtual images and real images. At present, most of head-mounted AR devices on the market generally adopt the principle of optical projection, that is, the integration of real scenes and virtual scenes is realized by means of lenses in front of eyes. A Surface-relief optical waveguide is a mainstream display optical scheme of the AR products. In the scheme, light emitted from an image source is coupled to the waveguide through an in-coupling grating for propagation, and when the light propagates to an out-coupling grating region, the light is coupled out by the out-coupling grating and then enters the human eye, such that the human eye can see the image source.

However, a refractive index of a grating material may affect the field of view of image display as well as the uniformity of color and brightness. Therefore, the refractive index of the grating material is a key index in the optical waveguide.

At present, manufacturing methods for high refractive index grating mainly include following two manners. In one manner, an imprint glue with a high refractive index is coated on a substrate, nano-imprint is performed on the imprint glue, and then a grating structure with the high refractive index is formed after demoulding. However, this manner is limited by the imprint glue, and it is difficult to continue to improve the refractive index of the grating structure formed. In addition, the glue with a high refractive index requires professional formula, which is expensive and makes the manufacturing cost high. In the other manner, a titanium oxide (TiOx) layer with a high refractive index is first plated on the substrate, a metal chromium (Cr) layer is plated on a surface of the TiOx layer, and then a imprint glue layer is coated on the metal Cr layer. Thereafter, nano-imprint and demoulding are respectively performed on the imprint glue layer, and then the metal Cr layer is used as a mask to etch a TiOx grating structure. Finally, a remaining imprint glue layer and metal Cr layer are removed to obtain the grating structure with the high refractive index. With this manner, the grating manufactured has the relatively high refractive index. However, the manner for manufacturing the grating is complex, a speed of etching the TiOx is slow, and the production efficiency is low, which may lead to an increase of a production cost.

SUMMARY

Embodiments of the disclosure aim to provide a grating, a method for manufacturing a grating, and an optical waveguide, so as to solve technical problems that a grating is low in a refractive index, manufacturing methods for the grating are complex, and a production efficiency of the grating is low in the related art.

Technical solutions of the disclosure are as follows.

A method for manufacturing a grating is provided. The method includes the following. A substrate is provided. A mask layer is formed on a surface of the substrate according to a target pattern structure of the grating, where the mask layer has a pattern structure complementary to the target pattern structure, and the pattern structure includes multiple protrusions and multiple recessed regions. The grating has a period in a range of 125 nm to 600 nm, and has a duty cycle in a range of 30% to 70%. The grating is formed by depositing a semiconductor material on the surface of the substrate on which the mask layer is provided. The semiconductor material is deposited in the multiple recessed regions of the pattern structure of the mask layer to form the grating having target pattern structure. The grating layer is thinner than the mask layer. The mask layer is removed by lift-off.

The technical solutions are further described as follows.

The mask layer is formed as follows.

A photoresist layer, as a sacrificial layer, is coated on the surface of the substrate. Exposing and developing are performed on the sacrificial layer in such a manner that the pattern structure is formed. The mask layer has a thickness in a range of 200 nm to 500 nm.

Alternatively, the mask layer is formed as follows.

A photoresist layer, as a sacrificial layer, is coated on the surface of the substrate. A curing adhesive layer is coated on a surface of the sacrificial layer away from the substrate. Nano-imprint is performed on the curing adhesive layer. Exposing and developing are performed on the sacrificial layer and a remaining curing adhesive layer on the sacrificial layer, where a developed sacrificial layer and a developed curing adhesive layer cooperatively form the pattern structure. The mask layer has a thickness in a range of 400 nm to 1000 nm.

Exposing and developing are performed as follows.

According to the pattern structure, the substrate is divided into multiple first portions and multiple second portions by defining a vertical direction of the substrate as a projection direction, where a projection of the multiple first portions is overlapped with that of the multiple protrusions, and a projection of the multiple second portions is overlapped with that of the multiple recessed regions. A part of the photoresist layer corresponding to the multiple second portions is removed by adopting a positive tone development scheme or a negative tone development scheme.

When the positive tone development scheme is adopted, exposing is performed on the part of the photoresist layer corresponding to the multiple second portions to harden the part of the photoresist layer corresponding to the multiple second portions, and the part of the photoresist layer corresponding to the multiple second portions is removed with a positive-tone developer solution.

When negative tone development scheme is adopted, exposing is performed on another part of the photoresist layer corresponding to the multiple first portions to harden the another part of the photoresist layer corresponding to the multiple first portions, and the part of the photoresist layer corresponding to the multiple second portions is removed with a negative tone developer solution.

The semiconductor material comprises includes any material selected from a group consisting of titanium oxide (TiOx), chromic oxide ($Cr_2O_3$), Lithium niobate ($LiNbO_3$), Titanium Silicon Oxide (TiSiOx), silicon carbide (SiC), Zinc Selenide (ZnSe), indium gallium arsenide (InGaAs), and Gallium Phosphide (GaP).

The semiconductor material is deposited by atomic layer deposition, electron beam evaporation, ion beam sputtering, magnetron sputtering, or chemical vapor deposition.

Embodiments of the disclosure further provide a grating. The grating includes a target pattern structure. The grating is manufactured by a method including: providing a substrate; forming, according to the target pattern structure of the grating, a mask layer on a surface of the substrate, wherein the mask layer has a pattern structure complementary to the target pattern structure, and the pattern structure comprises a plurality of protrusions and a plurality of recessed regions; forming the grating by depositing a semiconductor material on the surface of the substrate on which the mask layer is provided, wherein the semiconductor material is deposited in the plurality of recessed regions of the pattern structure of the mask layer to form the grating having the target pattern structure, wherein the grating is thinner than the mask layer; and removing the mask layer by lift-off. The grating has a period in a range of 125 nm to 600 nm, and has a duty cycle in a range of 30% to 70%.

The semiconductor material includes any material selected from a group consisting of titanium oxide (TiOx), chromic oxide ($Cr_2O_3$), Lithium niobate ($LiNbO_3$), Titanium Silicon Oxide (TiSiOx), silicon carbide (SiC), Zinc Selenide (ZnSe), indium gallium arsenide (InGaAs), and Gallium Phosphide (GaP).

The semiconductor material is deposited by atomic layer deposition, electron beam evaporation, ion beam sputtering, magnetron sputtering, or chemical vapor deposition.

Embodiments of the disclosure further provide an optical waveguide. The optical waveguide includes a waveguide body, an in-coupling grating, and an out-coupling grating. At least one of the in-coupling grating and the out-coupling grating is a grating manufactured by a method including: providing a substrate; forming, according to a target pattern structure of the grating, a mask layer on a surface of the substrate, wherein the mask layer has a pattern structure complementary to the target pattern structure, and the pattern structure comprises a plurality of protrusions and a plurality of recessed regions; forming the grating by depositing a semiconductor material on the surface of the substrate on which the mask layer is provided, wherein the semiconductor material is deposited in the plurality of recessed regions of the pattern structure of the mask layer to form the grating having the target pattern structure, wherein the grating is thinner than the mask layer; and removing the mask layer by lift-off. The grating has a period in a range of 125 nm to 600 nm, and has a duty cycle in a range of 30% to 70%.

The semiconductor material includes any material selected from a group consisting of titanium oxide (TiOx), chromic oxide ($Cr_2O_3$), Lithium niobate ($LiNbO_3$), Titanium Silicon Oxide (TiSiOx), silicon carbide (SiC), Zinc Selenide (ZnSe), indium gallium arsenide (InGaAs), and Gallium Phosphide (GaP).

The semiconductor material is deposited by atomic layer deposition, electron beam evaporation, ion beam sputtering, magnetron sputtering, or chemical vapor deposition.

According to the technical solutions of the disclosure, with aid of the method for manufacturing the grating, the mask layer is formed on the surface of the substrate. The target pattern structure of the grating is formed in the multiple recessed regions of the pattern structure of the mask layer by deposition. Thereafter, the mask layer is removed by lift-off, such that the grating is obtained. The method of the disclosure is simple, and after deposition, the target pattern structure can be obtained without etching. In addition, during removing of the mask layer by the lift-off, since the grating layer is thinner than the mask layer, the mask layer can be easily removed, which ensures that the grating to have a relatively refractive index, and further significantly improves the production efficiency and effectively reduces the production cost. Furthermore, the grating layer formed by deposition can effectively reduce a surface roughness of the substrate, thereby reducing light scattering loss caused by the surface roughness, so as to improve the imaging effect of the optical waveguide.

Reference numbers in figures are illustrated as follows.
1: substrate; 2: photoresist layer; 3: exposure template; 4: grating layer; 5: curing adhesive layer.

DETAILED DESCRIPTION OF THE EMBODIMENTS

In order to facilitate understanding of the disclosure, embodiments of the disclosure may be described more fully hereinafter with reference to the related drawings. Some exemplary embodiments of the disclosure are illustrated in the accompanying drawings. However, the disclosure may be embodied in many different forms and is not limited to the embodiments described herein. Rather, these embodiments are provided to provide a thorough and complete understanding of the present disclosure.

It should be noted that when an element is referred to as being "fixed to" another element, the element may be directly disposed on the another element or the element may be disposed on the another element via an intervening element. When an element is referred to as being "connected" to another element, the element may be directly connected to the other element or the element may be coupled to the another element via an intervening element.

Unless otherwise defined, all technical and scientific terms used herein have the same meanings as those generally understood by those skilled in the technical field of the disclosure. The terms used herein in the description of the disclosure are for the purpose of describing specific embodiments only, and are not intended to limit the disclosure.

First Embodiment

Figure 1:
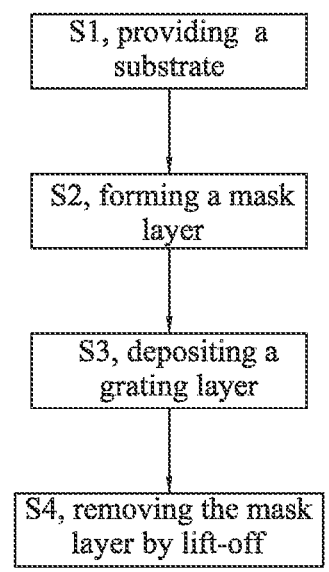
FIG. 1 is a schematic flow chart illustrating a method for manufacturing a grating according to embodiments of the disclosure.
Figure 2:
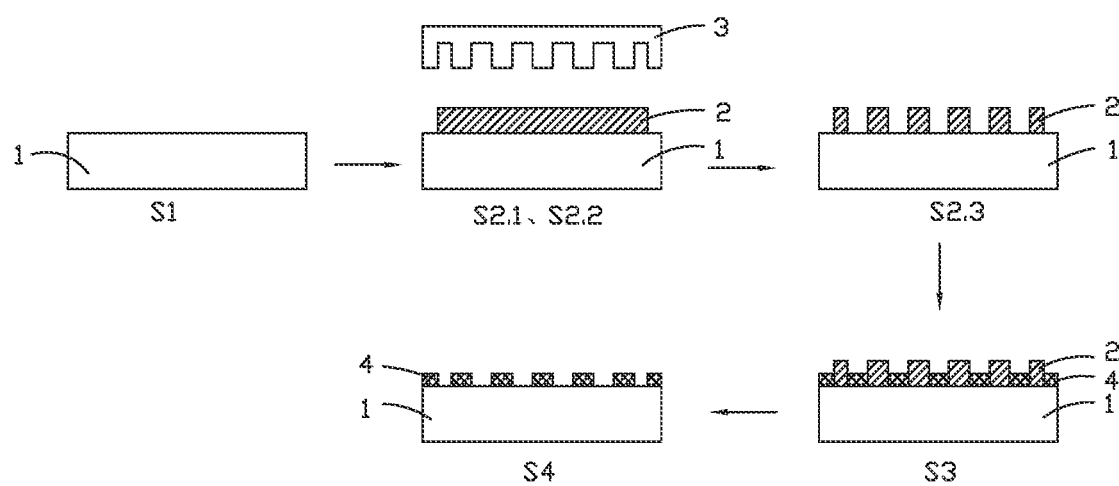
FIG. 2 is a schematic diagram illustrating a process of manufacturing of a grating according to a first embodiment of the disclosure.

Referring to FIG. 1 and FIG. 2, a method for manufacturing a grating is provided in a first embodiment of the disclosure and the method includes following operations.

At 51, a substrate is provided. A substrate 1 is placed in a cleaning device, soaked in ethanol absolute and acetone to remove a residual organic matter on the substrate 1, and then rinsed with a large amount of deionized water and dried. The substrate 1 may be a silicon wafer or a glass wafer of which both upper and lower surfaces are planar structures.

When it is necessary to prepare a curved grating, a substrate 1 with a curved structure may be provided, that is, the substrate 1 may be a curved silicon wafer or a curved glass wafer. A height difference of the curved structure is not greater than 1 mm.

At S2, a mask layer is formed. According to a target pattern structure of the grating, a mask layer is formed on a surface of the substrate 1, where the mask layer has a pattern structure complementary to the target pattern structure, and the pattern structure includes multiple protrusions and multiple recessed regions. The target pattern structure of the grating may be a one-dimensional rectangular grating structure, a two-dimensional cylindrical grating structure, a two-dimensional square grating structure, a two-dimensional hexagonal grating structure, a two-dimensional pentagonal grating structure, and the like.

In one example, the multiple protrusions and multiple recessed regions are defined relative to an upper surface of the substrate 1.

Since the target pattern structure is formed by deposition, a shape of the pattern structure of the mask layer needs to be complementary to a shape of the target pattern structure.

In embodiments, the mask layer is formed as follows.

At S2.1, a photoresist layer is coated. A photoresist layer 2, used as a sacrificial layer, is coated on the surface of the substrate 1 and then exposing and developing are performed on the sacrificial layer in such a manner that the pattern structure is formed.

The photoresist layer 2 is made from a general photoresist material, such as polyimide photoresist, krypton fluoride (KrF) photoresist, argon fluoride (ArF) photoresist, or the like. The photoresist layer 2 is coated by a spin coater, such as an EVG® 120 device. During coating, the spin coater is first rotated at a slow speed (such as 500 rpm/min) to perform glue dripping, and then is accelerated to rotate (such as 3000 rpm/min) to perform spin-coating. In addition, during coating, the spin coater performs heating with a heating plate to evaporate solvent. A heating temperature of a vacuum heating plate of the spin coater is in a range of 85° C. to 120° C., and a heating time of the vacuum heating plate ranges from 30 s to 60 s. The photoresist layer 2 has a thickness in a range of 200 nm to 500 nm, such as, 250 nm, 300 nm, 350 nm, 400 nm, or 450 nm. On condition that a concentration and a spin-coating rate of the photoresist layer 2 are constant, a thickness of a film obtained by a single spin-coating is constant, and therefore, the photoresist layer 2 of the preset thickness may be obtained by multiple spin-coatings. In the case of a constant concentration of the photoresist layer 2, the thicker the film obtained by a single spin-coating, the faster the spin-coating rate is required. A relation between a thickness of a film, a concentration of the photoresist layer, and a spin-coating rate of the photoresist layer can be expressed as follows:

$$h = kc/H = KC/\sqrt{w}$$

where h represents the thickness of the film, c represents the concentration of the photoresist layer, w represents the spin-coating rate, and k is a constant.

At S2.2, exposing is performed. An exposure template 3 is prepared according to the pattern structure. The substrate 1 is divided into multiple first portions and multiple second portions by defining a vertical direction of the substrate 1 as a projection direction, where a projection of the multiple first portions is overlapped with that of the multiple protrusions, and a projection of the multiple second portions is overlapped with that of the multiple recessed regions. Exposing is performed on a part of the photoresist layer 2 corresponding to the multiple second portions to harden the part of the photoresist layer 2 corresponding to the multiple second portions.

A dose for the exposing (exposure dose) depends on a material from which the photoresist layer 2 is made. Different materials may correspond to different exposure doses. During exposing, the substrate 1 needs to be moved up and down 1 to 5 times.

At S2.3, developing is performed. The substrate base 1 and the mask layer are immersed in a developer solution, and developed with a positive tone developer solution, so as to remove the part of the photoresist layer 2 corresponding to the multiple second portions. The developer solution is an alkaline aqueous solution, such as tetramethylammonium hydroxide (TMAH).

After development, a cleaning operation may be performed to further remove a residual photoresist layer 2, such that the pattern structure obtained may be more accurate. A cleaning solution for the cleaning may be butyl acetate, ethanol, trichloroethylene, or the like.

At S3, a grating layer is deposited. A grating layer 4 is deposited on the surface of the substrate 1 on which the mask layer is provided. The grating layer 4 is made of a semiconductor material having a relatively high refractive index. The grating layer 4 is deposited in the multiple recessed regions of the pattern structure of the mask layer in such a manner that the target pattern structure may be formed. The grating layer 4 has a thickness thinner than the mask layer. The grating layer 4 being thinner than the mask layer may facilitate removing of the sacrificial layer by lift-off.

The semiconductor material has a refractive index greater than 2.0 and may be, for example, one of titanium oxide (TiOx), chromic oxide ($Cr_2O_3$), Lithium niobate ($LiNbO_3$), Titanium Silicon Oxide (TiSiOx), silicon carbide (SiC), Zinc Selenide (ZnSe), indium gallium arsenide (InGaAs), and Gallium Phosphide (GaP).

The grating layer is deposited by atomic layer deposition (ALD), electron beam evaporation, ion beam sputtering, magnetron sputtering, or chemical vapor deposition (CVD).

The grating layer may be deposited by means of a deposition apparatus such as Optorun® SDARP-1800.

The technology of the ALD is relatively mature. By the ALD, the grating layer can be formed well and uniformly, and has good interface quality. However, compared to sputtering and evaporation, a speed of the ALD is relatively slow. The electron beam evaporation can locally heat element sources in the crucible without heating other parts by directionally bombarding the target with electron beam, thus avoiding pollution. The ion beam sputtering produces inert ions by ionizing inert gas. Under the action of Lorentz force, the inert ions are accelerated to bombard the target, which makes the atoms on the surface of the target detached, fly to and deposit on the surface of the substrate 1. The faster the deposition of the atoms, the better the process repeatability.

At S4, the mask layer is removed by lift-off. By the lift-off, the substrate 1 on which the grating layer 4 is deposited is placed in a solvent to dissolve the sacrificial layer, such that the mask layer is removed and a target grating is obtained.

The method provided in embodiments of the disclosure is simple in process. The grating layer is directly formed by the deposition, which is faster than the method in the related art. In addition, since there is no etching, the production efficiency is greatly improved and the production cost is significantly reduced. Furthermore, the target pattern structure of the grating manufactured according to embodiments is not limited, that is, gratings with various shapes can be manufactured, such as, curved surface gratings and variable period gratings. The grating manufactured according to embodiments has a period in a range of 125 nm to 600 nm, and has a duty cycle in a range of 30% to 70%. The grating manufactured by the method has better surface roughness and can effectively reduce light scattering.

The duty cycle can be calculated according to a following formula:

$$\text{Duty cycle} = \frac{\text{Line width}}{\text{Period} - \text{Line width}}.$$

Second Embodiment

Referring to FIG. 1 and FIG. 2, a method for manufacturing a grating is provided in a second embodiment of the disclosure. Operations described in the second embodiment are basically the same as those of the first embodiment. Same parts in the first embodiment and the second embodiment are not repeated herein. A difference between the second embodiment and the first embodiment may be described as follows.

At S2.2, exposing is performed. The substrate 1 is divided into multiple first portions and multiple second portions by defining a vertical direction of the substrate 1 as a projection direction, where a projection of the multiple first portions is overlapped with that of the multiple protrusions, and a projection of the multiple second portions is overlapped with that of the multiple recessed regions. Exposing is performed on another part of the photoresist layer 2 corresponding to the multiple first portions to harden the another part of the photoresist layer 2 corresponding to the multiple first portions.

An exposure dose depends on a material from which the photoresist layer 2 is made, and different materials correspond to different exposure doses. During exposing, the substrate 1 needs to be moved up and down 1 to 5 times.

At S2.3, developing is performed. The substrate base 1 and the mask layer are immersed in a developer solution, and developed with a negative tone developer solution, so as to remove the part of the photoresist layer 2 corresponding to the multiple second portions. The developer solution may be xylene.

Third Embodiment

Figure 3:
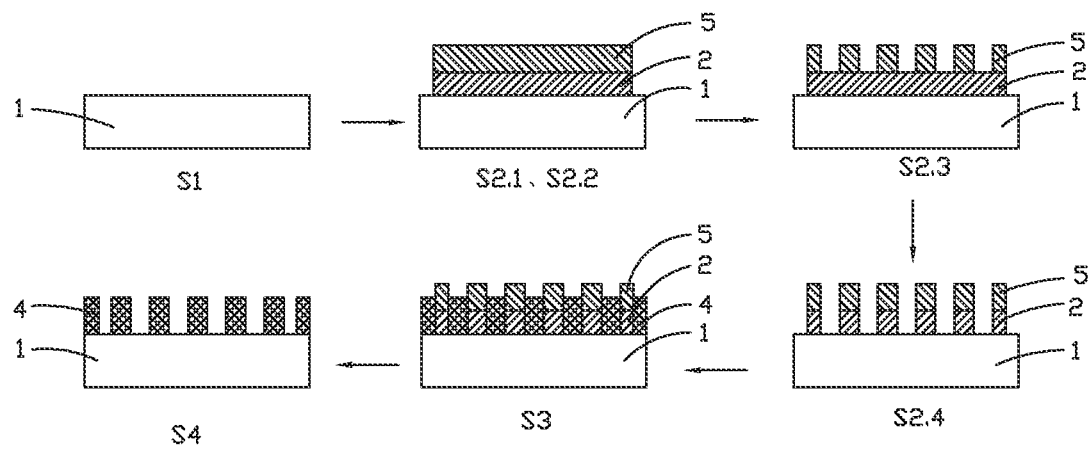
FIG. 3 is a schematic diagram illustrating a process of manufacturing of a grating according to a third embodiment of the disclosure.

Referring to FIG. 1 and FIG. 3, a method for manufacturing a grating is provided in a third embodiment of the disclosure. Operations described in the second embodiment are basically the same as those of the first embodiment. Same parts in the first embodiment and the second embodiment are not repeated herein. A difference between the second embodiment and the first embodiment may be described as follows.

At S2, a mask layer is formed. A photoresist layer 2, as a sacrificial layer, is coated on the surface of the substrate. A curing adhesive layer 5 is coated on a surface of the sacrificial layer away from the substrate. Nano-imprint is performed on the curing adhesive layer 5. Exposing and developing are performed on the sacrificial layer and a remaining curing adhesive layer on the sacrificial layer, where a developed sacrificial layer and a developed curing adhesive layer cooperatively form the pattern structure.

Since the target pattern structure is formed by deposition, a shape of the pattern structure of the mask layer needs to be complementary to a shape of the target pattern structure.

In particular, the mask layer is formed as follows.

At S2.1, a photoresist layer is coated. A photoresist layer 2, as a sacrificial layer, is coated on the surface of the substrate 1 and then exposing and developing are performed on the sacrificial layer in such a manner that the pattern structure is formed.

The photoresist layer 2 is made from a general photoresist material, such as polyimide photoresist, KrF photoresist, ArF photoresist, or the like. The photoresist layer 2 is coated by a spin coater, such as an EVG® 120 device. During coating, the spin coater is first rotated at a slow speed (such as 500 rpm/min) to perform glue dripping, and then is accelerated to rotate (such as 3000 rpm/min) to perform spin-coating. In addition, during coating, the spin coater performs heating with a heating plate to evaporate solvent. A heating temperature of a vacuum heating plate of the spin coater is in a range of 85° C. to 120° C., and a heating time of the vacuum heating plate ranges from 30 s to 60 s. The photoresist layer 2 has a thickness in a range of 200 nm to 500 nm, such as, 220 nm, 270 nm, 320 nm, 370 nm, or 420 mm.

At S2.2, a curing adhesive layer is coated. An ultraviolet curing adhesive layer 5 is coated on a surface of the sacrificial layer away from the substrate.

At S2.3, the curing adhesive layer is imprinted. Nano-imprint is performed on the curing adhesive layer 5, to form the pattern structure complementary to the target pattern structure. The pattern structure includes multiple protrusions and multiple recessed regions. Since the cured adhesive layer 5 is anaerobic, nitrogen should be introduced to drive away oxygen before imprinting, and nitrogen should be continuously introduced to maintain nitrogen atmosphere during following exposure.

At S2.4, the pattern structure is formed. According to the pattern structure, the substrate 1 is divided into multiple first portions and multiple second portions by defining a vertical direction of the substrate 1 as a projection direction, where a projection of the multiple first portions is overlapped with that of the multiple protrusions, and a projection of the multiple second portions is overlapped with that of the multiple recessed regions. Exposing is performed on a part of the photoresist layer 2 corresponding to the multiple second portions to harden the part of the photoresist layer 2 corresponding to the multiple second portions. Developing is performed with a positive-tone developer solution to remove the part of the photoresist layer 2 and a residual cured adhesive layer 5 corresponding to the multiple second portions, to form a pattern structure.

An exposure dose depends on a material of the photoresist layer, and different exposure doses are determined according to different materials. During exposing, the substrate 1 needs to be moved up and down 1 to 5 times.

Alternatively, the pattern structure may be formed by photolithography, for example, the part of the photoresist layer 2 and the residual cured adhesive layer 5 corresponding to the multiple second portions may be etched by a reactive ion etching (ME) machine to form the pattern structure. Although a photolithography technology is adopted in embodiments, the photoresist layer 2 is etched instead of the TiO2 layer or the metal layer in the related art, so that the etching rate is fast and the overall production efficiency is not affected.

Wet etching molding or dry etching molding can be selected according to actual needs. Generally, a line width of dry etching can be accurately controlled, while wet etching is simpler.

A thickness of the mask layer manufactured by the method provided in embodiments may be in a range of 400 to 1000 nm. To facilitate subsequent lift-off operations, the grating layer 4 deposited needs to be thinner than the mask layer, and therefore, the grating layer 4 manufactured according to the method of the embodiments can be thicker. According to the method of embodiments, the sacrificial layer with a high aspect ratio may be manufactured, but the manufacturing process may be more complex.

Fourth Embodiment

Embodiments of the disclosure provide a grating. The grating is prepared by any of the methods provided in the first embodiment to the third embodiment. The grating has a period in a range of 125 nm to 600 nm, and has a duty cycle in a range of 30% to 70%.

Fifth Embodiment

Embodiments of the disclosure provide an optical waveguide. The optical waveguide includes a waveguide body, an in-coupling grating, and an out-coupling grating. At least one of the in-coupling grating and the out-coupling grating is the grating described in the fourth embodiment.

The grating layer 4 in the optical waveguide of embodiments is formed by deposition, and a roughness between the grating layer 4 and the substrate 1 is relatively small, which can effectively reduce the light scattering and improve the imaging effect of the optical waveguide.

The foregoing merely describes some embodiments of the disclosure, and it should be noted that improvements made to those of ordinary skill in the art without departing from the inventive concept of the disclosure shall fall within the scope of protection of the disclosure.

What is claimed is:

1. A method for manufacturing a grating, comprising:
providing a substrate;
forming, according to a target pattern structure of the grating, a mask layer on a surface of the substrate, wherein the mask layer has a pattern structure complementary to the target pattern structure, and the pattern structure comprises a plurality of protrusions and a plurality of recessed regions, wherein the grating has a period in a range of 125 nm to 600 nm, and has a duty cycle in a range of 30% to 70%;
forming the grating by depositing a semiconductor material on the surface of the substrate on which the mask layer is provided, wherein the semiconductor material is deposited in the plurality of recessed regions of the pattern structure of the mask layer to form the grating having the target pattern structure, wherein the grating is thinner than the mask layer; and
removing the mask layer by lift-off;
wherein forming the mask layer comprises:
coating, on the surface of the substrate, a photoresist layer as a sacrificial layer;
coating a curing adhesive layer on a surface of the sacrificial layer away from the substrate;
performing nano-imprint on the curing adhesive layer; and
performing exposing and developing on the sacrificial layer and a remaining curing adhesive layer on the sacrificial layer, wherein a developed sacrificial layer and a developed curing adhesive layer cooperatively form the pattern structure.

2. The method of claim 1, wherein forming the mask layer comprises:
coating, on the surface of the substrate, a photoresist layer as a sacrificial layer; and
performing exposing and developing on the sacrificial layer in such a manner that the pattern structure is formed.

3. The method of claim 2, wherein the mask layer has a thickness in a range of 200 nm to 500 nm.

4. The method of claim 2, wherein performing the exposing and the developing comprises:
dividing, according to the pattern structure, the substrate into a plurality of first portions and a plurality of second portions by defining a vertical direction of the substrate as a projection direction, wherein a projection of the plurality of first portions is overlapped with that of the plurality of protrusions, and a projection of the plurality of second portions is overlapped with that of the plurality of recessed regions; and
removing a part of the photoresist layer corresponding to the plurality of second portions by adopting a positive tone development scheme or a negative tone development scheme, comprising:
in response to the positive tone development scheme being adopted: performing exposing on the part of the photoresist layer corresponding to the plurality of second portions to harden the part of the photoresist layer corresponding to the plurality of second portions, and removing the part of the photoresist layer corresponding to the plurality of second portions with a positive-tone developer solution; and
in response to the negative tone development scheme being adopted: performing exposing on another part of the photoresist layer corresponding to the plurality of first portions to harden the another part of the photoresist layer corresponding to the plurality of first portions, and removing the part of the photoresist layer corresponding to the plurality of second portions with a negative tone developer solution.

5. The method of claim 1, wherein the mask layer has a thickness in a range of 400 nm to 1000 nm.

6. The method of claim 1, wherein performing the exposing and the developing comprises:
dividing, according to the pattern structure, the substrate into a plurality of first portions and a plurality of second portions by defining a vertical direction of the substrate as a projection direction, wherein a projection of the plurality of first portions is overlapped with that of the plurality of protrusions, and a projection of the plurality of second portions is overlapped with that of the plurality of recessed regions; and
removing a part of the photoresist layer corresponding to the plurality of second portions by adopting a positive tone development scheme or a negative tone development scheme, comprising:
in response to the positive tone development scheme being adopted: performing exposing on the part of the photoresist layer corresponding to the plurality of second portions to harden the part of the photoresist layer corresponding to the plurality of second portions, and removing the part of the photoresist layer corresponding to the plurality of second portions with a positive-tone developer solution; and in response to the negative tone development scheme being adopted: performing exposing on another part of the photoresist layer corresponding to the plurality of first portions to harden the another part of the photoresist layer corresponding to the plurality of first portions, and removing the part of the photoresist layer corresponding to the plurality of second portions with a negative tone developer solution.

7. The method of claim 1, wherein the semiconductor material comprises any material selected from a group consisting of titanium oxide (TiOx), chromic oxide ($Cr_2O_3$), Lithium niobate ($LiNbO_3$), Titanium Silicon Oxide (TiSiOx), silicon carbide (SiC), Zinc Selenide (ZnSe), indium gallium arsenide (InGaAs), and Gallium Phosphide (GaP).

8. The method of claim 7, wherein the semiconductor material is deposited by atomic layer deposition, electron beam evaporation, ion beam sputtering, magnetron sputtering, or chemical vapor deposition.

9. The method of claim 1, wherein the semiconductor material is deposited by atomic layer deposition, electron beam evaporation, ion beam sputtering, magnetron sputtering, or chemical vapor deposition.

\* \* \* \* \*